(12) United States Patent
Lee (10) Patent No.: US 7,118,419 B1
(45) Date of Patent: Oct. 10, 2006

(54) FOLDABLE SIM CARD CONNECTOR

(75) Inventor: Yun Chien Lee, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/396,695

(22) Filed: Apr. 4, 2006

(51) Int. Cl.
*H01R 24/00* (2006.01)

(52) U.S. Cl. .................. 439/630; 439/326; 439/331
(58) Field of Classification Search ............... 439/630, 439/331, 326
See application file for complete search history.

(56) References Cited

U.S. PATENT DOCUMENTS

| | | | | |
|---|---|---|---|---|
| 5,813,878 | A * | 9/1998 | Kuwata et al. ............ | 439/326 |
| 5,996,891 | A * | 12/1999 | Braun ....................... | 235/441 |
| 6,174,188 | B1 * | 1/2001 | Martucci ................... | 439/326 |
| 6,220,882 | B1 * | 4/2001 | Simmel et al. ............ | 439/326 |
| 6,224,418 | B1 * | 5/2001 | Miura et al. .............. | 439/495 |
| 6,241,545 | B1 * | 6/2001 | Bricaud et al. ............ | 439/326 |
| 6,319,036 | B1 * | 11/2001 | Zheng et al. .............. | 439/326 |
| 6,338,648 | B1 * | 1/2002 | Miura et al. .............. | 439/495 |
| 6,468,101 | B1 * | 10/2002 | Suzuki ...................... | 439/326 |
| 6,471,550 | B1 * | 10/2002 | Maiterth et al. .......... | 439/631 |
| 6,743,035 | B1 * | 6/2004 | Yang ......................... | 439/326 |
| 6,884,102 | B1 * | 4/2005 | Rumpel et al. ............ | 439/331 |
| 6,890,203 | B1 * | 5/2005 | Matsunaga et al. ........ | 439/331 |
| 6,913,479 | B1 * | 7/2005 | Su et al. .................... | 439/326 |
| 6,971,919 | B1 * | 12/2005 | Huang ....................... | 439/630 |
| 7,029,306 | B1 * | 4/2006 | Bilcauu et al. ............ | 439/326 |
| 7,048,566 | B1 * | 5/2006 | Natori ....................... | 439/326 |

* cited by examiner

Primary Examiner—Tulsidas C. Patel
Assistant Examiner—Harshad Patel
(74) Attorney, Agent, or Firm—Rosenberg, Klein & Lee (57) ABSTRACT

A foldable SIM card connector includes a body, a cover pivotally assembled with the body and a plurality of terminals received in the body. A rear portion of the body defines a beam, a rejecting portion and a pair of stop arms. A rear portion of the cover forms a resisting board, a pair of stop boards and a pair of stop edges. While the cover is opened to a certain angle, the resisting board is located below and pressed against the beam of the body. The stop board is located behind and presses against the rejecting portion of the body. Besides, the stop arm contacts the stop edge of the cover. These mechanisms avoid the cover pressing the edge of the fixing cavity of the mobile phone, and further prevent the cover from being propped up and falling off.

13 Claims, 6 Drawing Sheets

FOLDABLE SIM CARD CONNECTOR

BACKGROUND OF THE INVENTION

1. Field of the Invention

The present invention relates to a foldable subscriber identity module (SIM) card connector, and particularly to a foldable SIM card connector with mechanisms to avoid the falling off of the cover.

2. The Related Art

A foldable subscriber identity module (SIM) card connector is commonly used in electric devices such as mobile phone. A SIM card usually includes a terminal module to communicate with an identifying device. Accordingly, the SIM card connector includes a receiving cavity to receive the SIM card and a plurality of terminals to couple with the terminal module of the SIM card. While the SIM card is inserted into the receiving cavity of the SIM card connector, the terminals of the SIM card connector communicate with the terminal module of the SIM card to achieve the communication between the SIM card connector and the SIM card.

A traditional foldable SIM card connector includes a body, a cover, and a plurality of terminals received in the body. The cover defines a receiving cavity to receive the SIM card. One end of the terminal connects with the SIM card. The other end of the terminal connects with an external printed circuit board (PCB). The body defines a pair of pivoting holes. Coupling with the pivoting holes, the cover defines a pair of pivots. The pivots of the cover are pivotally fixed in the pivoting holes of the body. The cover can be closed and opened around the pivots.

However, the foldable SIM card is usually fixed in a fixing cavity defined on an inside surface of the mobile phone. While the foldable SIM card is closed, the top surface of the cover and the inside surface of the mobile phone are seated on the same plane. This means that, while the cover is opened to a certain angle, the edge of the fixing cavity becomes a fulcrum to the cover. While the cover is opened surpass this certain angle, the pivots of the cover are easily propped up and moved out of the pivoting cavities of the body which leading to the cover falling off the body.

SUMMARY OF THE INVENTION

Accordingly, an object of the present invention is to provide a foldable subscriber identity module (SIM) card connector includes a body, a cover pivotally assembled with the body and a plurality of terminals received in the body. The rear portion of the body stretches backward to form a pair of connecting portions. Each connecting portion defines a pivoting cavity. A beam is formed to connect the connecting portions. The thickness of the beam is thinner than that of the body. So, a receiving space is formed between the beam and the bottom surface of the body. The cover includes a top board and a pair of side boards. The side boards stretch backward and form a pair of pivots to pivotally couple with the pivoting cavities of the body. The rear portion of the top board is bent downward to form a resisting board. While the cover is opened to a certain angle, the resisting board is received in the receiving space, below and presses against the beam of the body.

Another object of the present invention is to provide a foldable SIM card connector includes a body, a cover pivotally assembled with the body and a plurality of terminals received in the body. The rear portion of the body stretches backward to form a pair of connecting portions and a rejecting portion. Each connecting portion defines a pivoting cavity. The cover includes a top board and a pair of side boards. The side boards stretch backward and form a pair of pivots to pivotally couple with the pivoting cavities of the body. The top board of the cover stretches backward and forms a stop board to couple with the rejecting portion of the body. While the cover is opened to a certain angle, the stop board locates behind and presses against the rejecting portion of the body.

A further object of the present invention is to provide a foldable SIM card connector includes a body, a cover pivotally assembled with the body and a plurality of terminals received in the body. The rear portion of the body stretches backward to form a pair of connecting portions. Each connecting portion defines a pivoting cavity. The body stretches outside behind the pivoting cavity to form a stop arm. The cover includes a top board and a pair of side boards. The side boards stretch backward and form a pair of pivots to pivotally couple with the pivoting cavities of the body. Coupling with the stop arm of the body, each side board of the cover defines a stop edge above the pivot. While the cover is opened to a certain angle, the stop arms of the body locate behind and resist against the stop edges of the cover.

As described in the foregoing objects, through every mechanism or a combination of two or three of these mechanisms, a further opening of the cover can be avoided. These mechanisms avoid the cover pressing the edge of the fixing cavity of the mobile phone, and further prevent the cover from being propped up and falling off.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENTS

Figure 1:
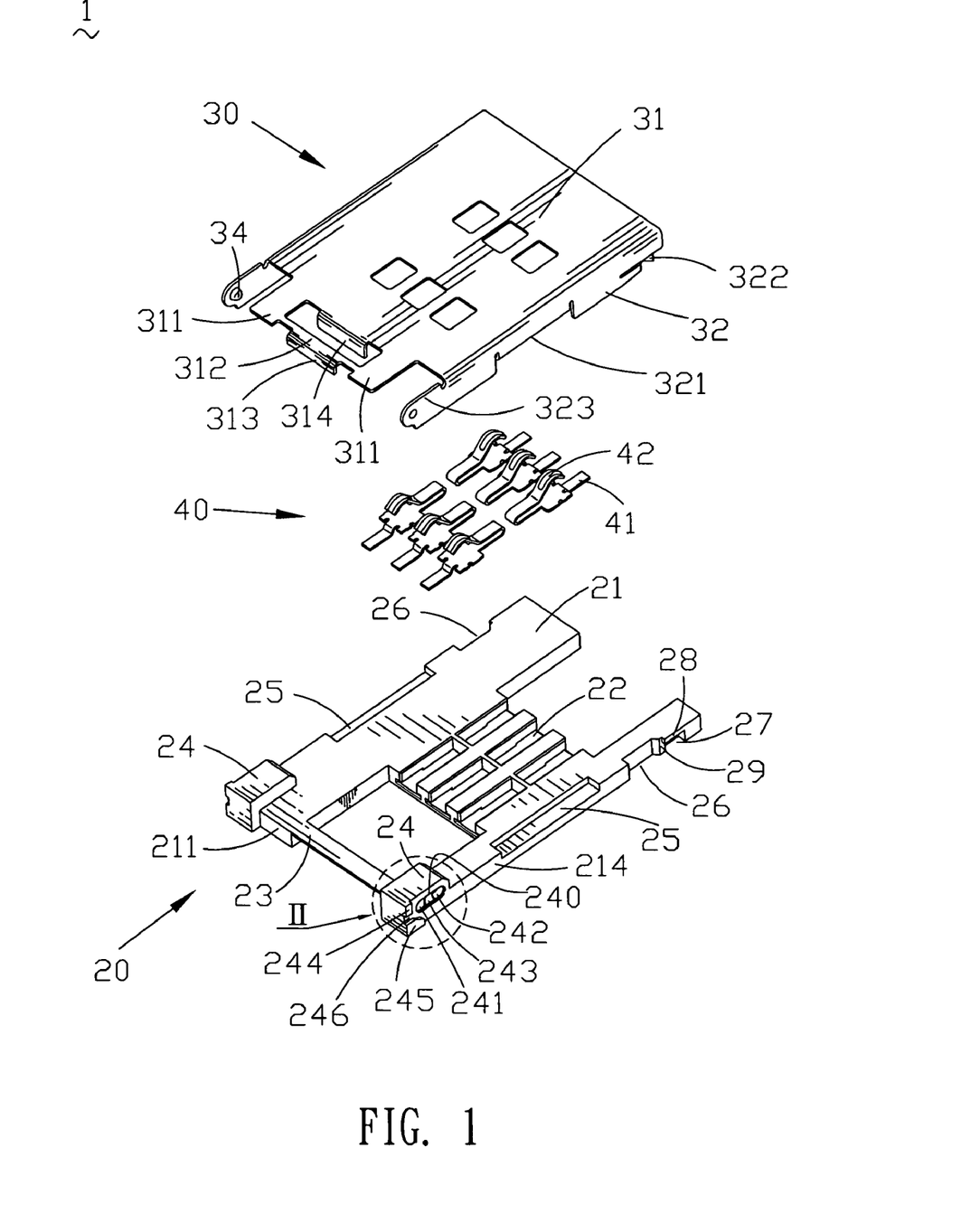
FIG. 1 is a perspective exploded view of a foldable SIM card connector according to the present invention.

Referring to FIG. 1, showing an embodiment of a foldable subscriber identity module (SIM) card connector 1 in accordance with the present invention, the foldable SIM card connector 1 includes a body 20, a cover 30 pivotally assembled with the body 20 and a plurality of terminals 40 received in the body 20.

As shown in FIG. 1, the front portion of the body 20 defines an opening. The mid portion of the body 20 defines a plurality of terminal cavities 22. The body 20 stretches backward from two sides thereof to form a pair of connecting portions 24. A beam 23 is defined between the connecting portions 24. The thickness of the beam 23 is thinner than that of the body 20. The beam 23 connects each of the connecting portions 24, so a receiving space is formed between the beam 23 and the bottom surface of the body 20. One end of the beam 23 is a rejecting portion 211 stretching backward from the body 20. Each connecting portion 24 defines a pivoting cavity 240 on the side. The pivoting cavity 240 further forms a first pivoting hole 241, a second pivoting hole 242 in front of the first pivoting hole 241, and a stop portion 243 between the first and the second pivoting holes 241, 242. The surface of the stop portion 243 is lower than that of a side surface 214 of the body 20 to form a groove communicating with the first and the second pivoting holes 241, 242.

Figure 2:
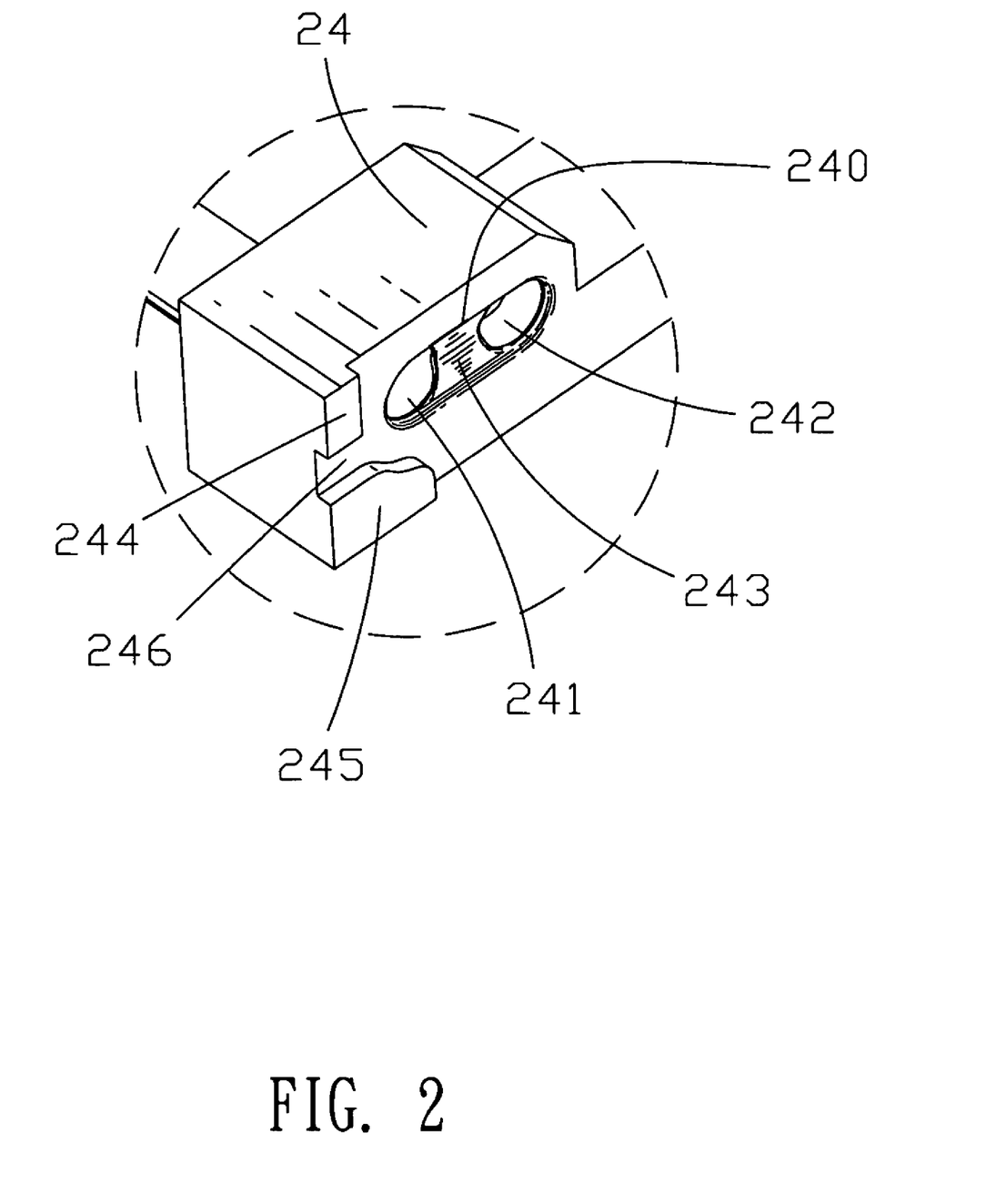
FIG. 2 is an enlarged view of the encircled portion II of FIG. 1.

Referring to FIG. 2, each connecting portion 24 defines a stop arm 244 behind the first pivoting hole 241. A projection 245 is defined below the stop arm 244. So a fixing channel 246 is formed between the stop arm 244 and the projection 245 for allowing the cover 30 to be fixed in the body 20.

Now referring to FIG. 1 again, the mid portion of the body 20 defines a pair of oblong cavities 25 on both sides thereof. The front portion of the body 20 defines a pair of receiving cavities 26. The receiving cavity 26 communicates with the top surface of the body 20. A locking cavity 27 is formed on the front portion of the body 20 and is adjacent to each receiving cavity 26. The locking cavity 27 is dented from the bottom portion of the side surface 214. The body 20 forms a locking lump 28 above the locking cavity 27. A stop lump 29 is formed between the receiving cavity 26 and the locking cavity 27.

Referring to FIGS. 1 and 2, each terminal 40 includes a soldering portion 41 and a contacting portion 42 bent from one end of the soldering portion 41. The soldering portion 41 is soldered with an external print circuit board (PCB, not shown). The contacting portion 42 elastically contacts a SIM card (not shown).

Now referring to FIG. 1 again, the cover 30 includes a top board 31 and a pair of side boards 32 bending downward from the opposite sides of the top board 31. The rear portion of the top board 31 is bent downward from the mid to form a fixing board 314. The top board 31 stretches backward from the side of the fixing board 314 and forms a pair of stop boards 311 to couple with the rejecting portion 211 of the body 20. A connecting board 312 connects the rear portion of the stop boards 311. The rear end of the connecting board 312 is bent downward to form a resisting board 313. The mid portion of each side board 32 is bent inward to form a holding board 321 coupling with the oblong cavities 25 of the body 20. The holding board 321, the top board 31 and the fixing board 314 define a housing to receive the SIM card. The rear portion of each side board 32 stretches backward and forms an pivot 34 to couple with the first and the second pivoting holes 241, 242 of the body 20. Each side board 32 forms a stop edge 323 above the pivoting cavity 240 to couple with the stop arm 244 of the body 20. The front portion of each side board 32 stretches inward to form an elastic locking portion 322 in order to couple with the receiving cavity 26 and the locking cavity 27 of the body 20.

Figure 3:
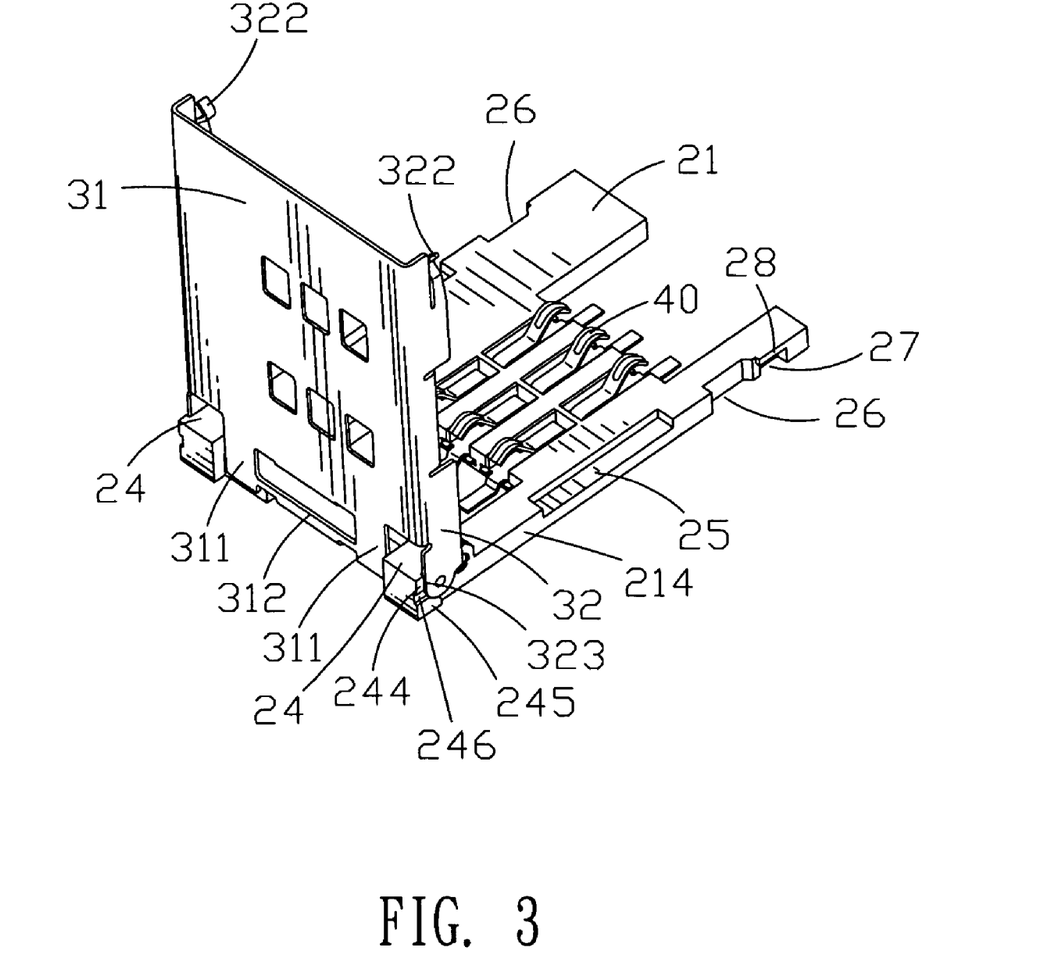
FIG. 3 is a perspective view of the foldable SIM card connector while the foldable SIM card connector is opened.
Figure 4:
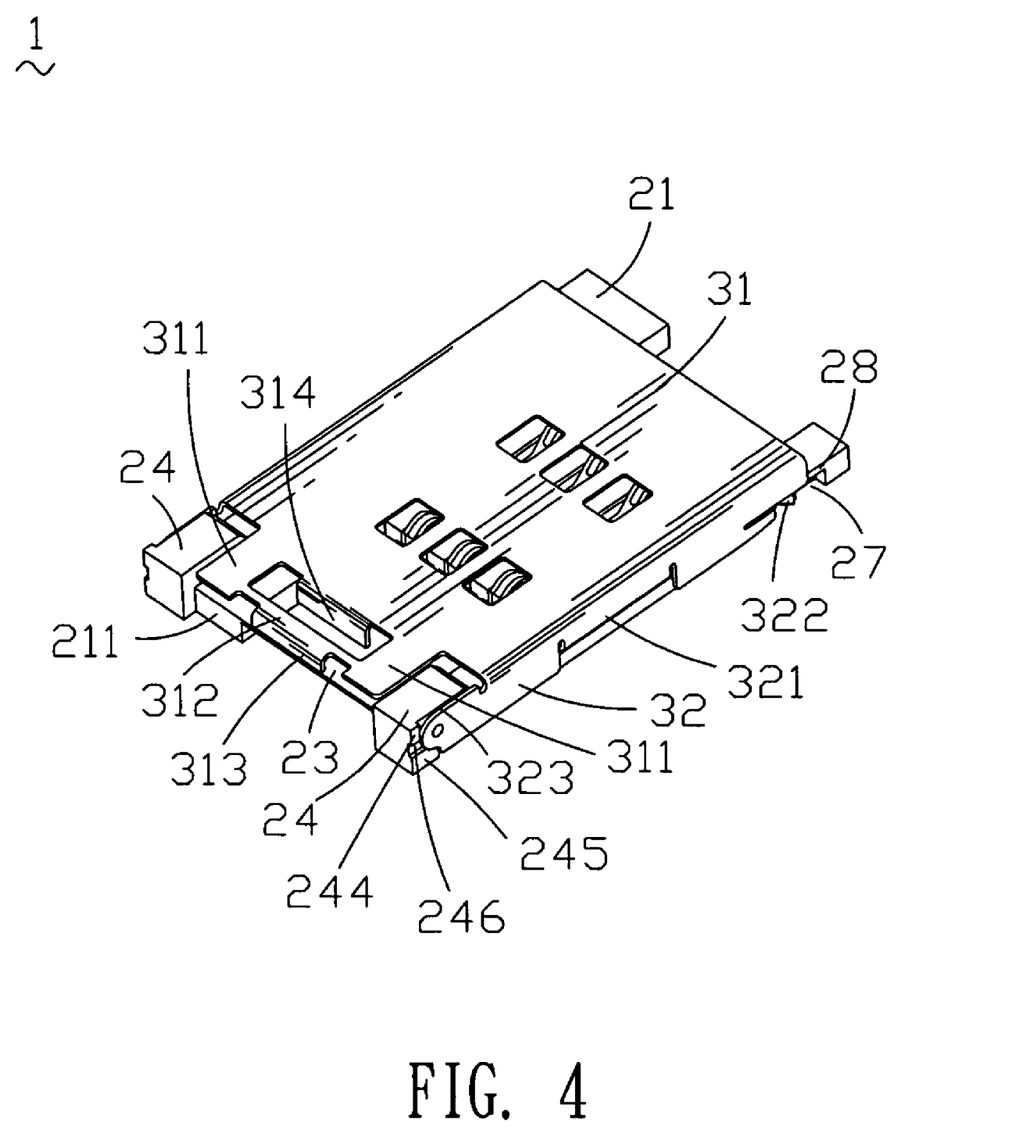
FIG. 4 is a perspective view of the foldable SIM card connector while the foldable SIM card connector is closed.
Figure 5:
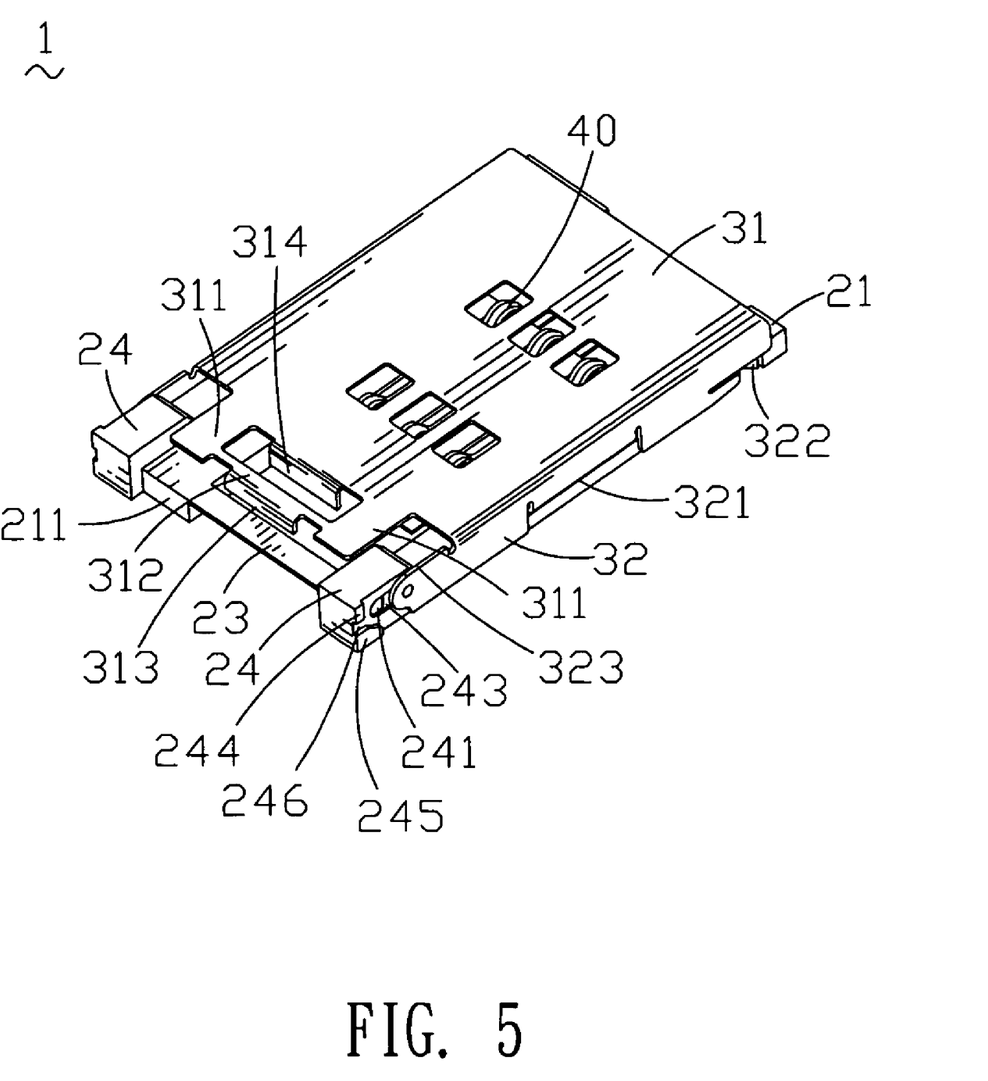
FIG. 5 is a perspective view of the foldable SIM card connector while the foldable SIM card connector is locked.

Further referring to FIGS. 1 to 3, while the card connector 1 is assembled, the terminals 40 are respectively fixed in the terminal cavities 22. The soldering portion 41 of the terminal 40 stretches out of the terminal cavity 22 to be soldered with the external PCB. Then, while the active angle between the cover 30 and the body 20 is equal to or less than ninety degree, the pivots 34 of the cover 30 are inserted into the first pivoting hole 241 of the body 20 through the fixing channel 246 of the body 20. So, the cover 30 is pivotally assembled with the body 20.

Referring to FIGS. 3 to 6, while the card connector 1 is in use, the SIM card is inserted into the housing of the cover 20 with the fixing board 314 contacting with the SIM card. Then, the cover 30 is rotated around the pivots 34 and closed with the holding board 321 received in the oblong cavity 25 of the body 20 and the elastic locking portion 322 of the cover 20 located in the receiving cavity 26 of the body 20. Finally, the cover is pushed forward to make sure that the elastic locking portion 322 is pushed into the locking cavity 27 and locked by the locking lump 28 of the body 20. Meanwhile, guided by the groove of the stop portion 243, the pivots 34 of the cover 30 move out of the first pivoting holes 241 and get into the second pivoting holes 242. At the same time, the contacting portions 42 of the terminals 40 respectively contact the terminals (not shown) of the SIM card.

While the SIM card is being taken out of the card connector 1, the cover 30 of the card connector 1 is pushed backward. Guided by the groove of the stop portions 243, the pivots 34 of the cover 30 move out of the second pivoting holes 242 and get into the first pivoting holes 241. At the same time, the elastic locking portions 322 of the cover 30 move out of the locking cavities 27, slide over the stop lump 29 and get into the receiving cavities 26 of the body 20. Then, the cover 30 is rotated around the pivots 34. The resisting board 313 is received in the receiving space below the beam 23 of the body 20. So the cover 30 is opened. After a certain angle between the cover 30 and the body 20 is formed, the SIM card is taken out.

Figure 6:
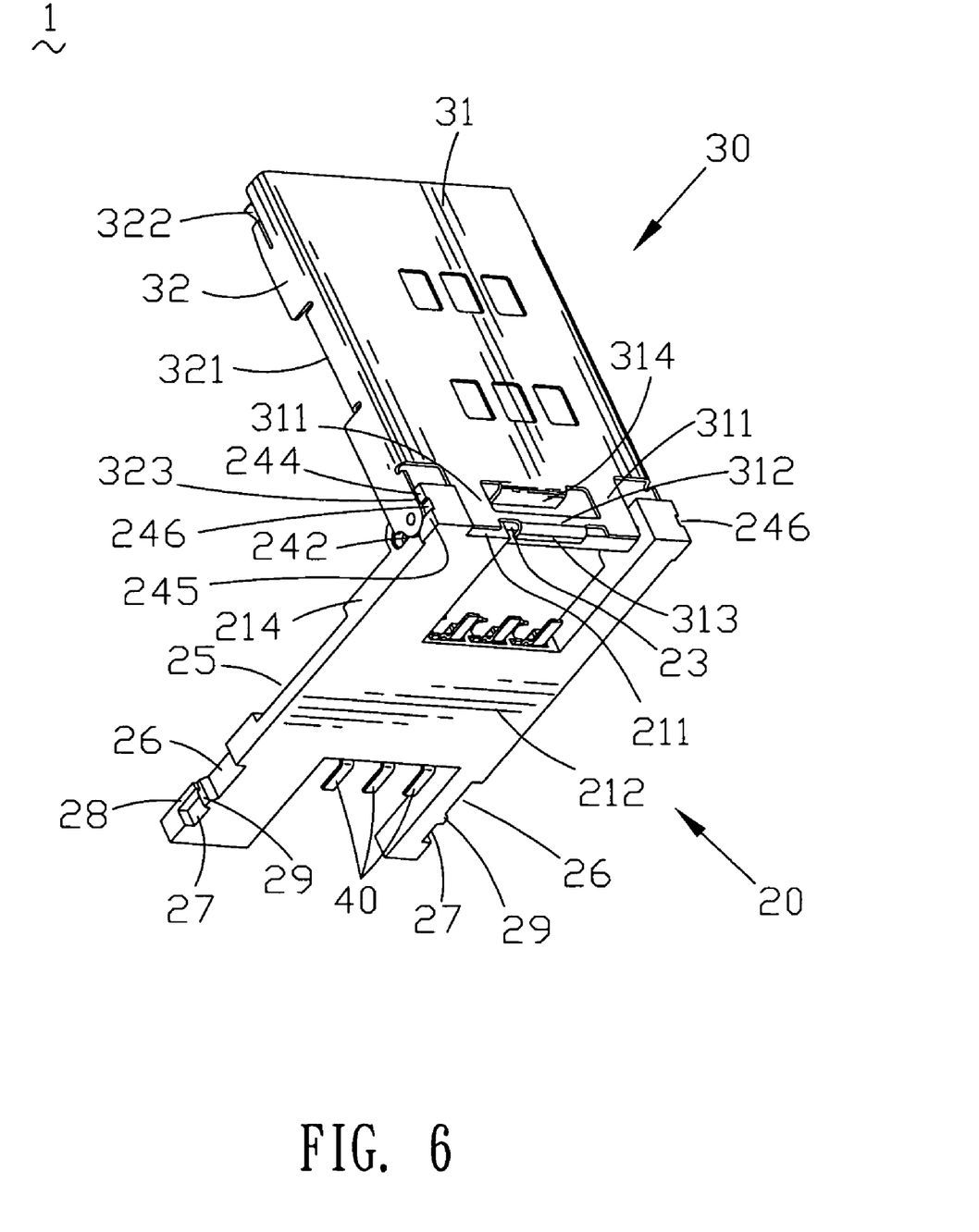
FIG. 6 is a perspective view of the foldable SIM card connector while a cover is opened and approximately perpendicular to a body.

Referring to FIG. 6, while the cover 30 is approximately perpendicular to the body 20, the stop boards 311 of the cover 30 press the rejecting portion 211 of the body 20 in order to prevent a further opening or falling off of the cover 30. Besides, the resisting board 313 of the cover 30 presses the bottom surface of the beam 23. So the further opening and the falling off of the cover are avoided. At the same time, the stop arms 244 behind the first pivoting holes 241 of the body 20 reject the stop edges 323 of the cover 30 and also avoid further opening of the cover 30.

As the foregoing description of the present invention, in order to keep the cover 30 opening to a certain angle, there are several methods. The certain angle can be 90 degree or according to the practice to make it to be other angles, such as 120 degree. At the same time, as the foregoing description of the present invention in, in order to avoid the cover 30 falling off from the body 20 while the cover 30 is opened, there are several manners. For example, the falling off of the cover 30 from the body 20 is prevented by pressing the resisting board 313 of the cover 30 against the bottom surface of the beam 23 of the body, pressing the stop board 311 of the cover 30 against the rejecting portion 211 of the body 20, or pressing of the stop edges 323 of the cover 20 against the stop arms 244 of the body 20. Therefore, the card connector 1 is only opened to a certain angle and the falling off of the cover 30 is avoided.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A foldable SIM card connector comprising:
   a body defining a plurality of terminal cavities and a pair of connecting portions stretching backward from a side of said body;
   a cover defining a top board, a pair of side boards, and a pair of pivots;
   said pivot locating on a rear portion of said side board; and
   a plurality of terminals received in said terminal cavities of said body;
   wherein:
   said connecting portions of said body define a pair of pivoting cavities to couple with said pivots of said cover;
   a rear portion of said cover bent downward to form a resisting board;
   said body defining a beam connecting to said connecting portions and disposed between said connecting portions;
   a receiving space formed between said beam and the bottom surface of said body; and said resisting board of said cover pressing said beam of said body while said foldable SIM card connector being opened to a certain angle.

2. The foldable SIM card connector as claimed in claim 1, wherein said certain angle is 90 degree.

3. The foldable SIM card connector as claimed in claim 1, wherein:
   each of said pivoting cavities defines a first pivoting hole and a second pivoting hole being adjacent to said first pivoting hole;
   a stop portion formed between said first and second pivoting holes; and
   said stop portion forms a groove communicating with said first and second pivoting hole.

4. The foldable SIM card connector as claimed in claim 3, wherein:
   said body defines at least one receiving cavity and a locking cavity being adjacent to said receiving cavity;
   said receiving cavity communicating with the top surface of said body;
   a locking lump formed above said locking cavity;
   a stop lump located between said receiving cavity and said locking cavity; and
   a front portion of said side board of said cover defining at least one elastic locking portion to couple with said receiving and locking cavities of said body and being locked by said locking lump.

5. A foldable SIM card connector comprising:
   a body defining a plurality of terminal cavities and a pair of connecting portions stretching backward from a side of said body;
   a cover defining a top board, a pair of side boards, and a pair of pivots;
   said pivot locating on a rear portion of said side board; and
   a plurality of terminals received in said terminal cavities of said body;
   wherein:
   said connecting portions of said body define a pair of pivoting cavities to couple with said pivots of said cover;
   a rear portion of said cover stretching backward and forming at least one stop board;
   a rear portion of said body stretching backward and forming at least one rejecting portion to couple with said stop board of said cover; and
   said stop board located behind and pressing against said rejecting portion of said body while said foldable SIM card connector is opened to an angle.

6. The foldable SIM card connector as claimed in claim 5, wherein said angle is 90 degree.

7. The foldable SIM card connector as claimed in claim 5, wherein:
   each said pivoting cavity defines a first pivoting hole and a second pivoting hole being adjacent to said first pivoting hole;
   a rejecting portion formed between said first and second pivoting holes; and
   said stop portion forms a groove communicating with said first and second pivoting hole.

8. The foldable SIM card connector as claimed in claim 7, wherein:
   said body defines at least one receiving cavity and a locking cavity being adjacent to said receiving cavity;
   said receiving cavity communicating with the top surface of said body;
   a locking lump formed above said locking cavity;
   a stop lump located between said receiving cavity and said locking cavity; and
   a front portion of said side board of said cover defining at least one elastic locking portion to couple with said receiving and locking cavities of said body and being locked by said locking lump.

9. A foldable SIM card connector comprising:
   a body defining a plurality of terminal cavities and a pair of connecting portions stretching backward from a side of said body;
   a cover defining a top board, a pair of side boards, and a pair of pivots;
   said pivot locating on a rear portion of said side board; and
   a plurality of terminals received in said terminal cavities of said body;
   wherein:
   said connecting portions of said body define a pair of pivoting cavities to couple with said pivots of said cover;
   each said rear portion defining a stop arm behind said pivoting cavity of said body;
   each said side board of said cover defining a stop edge above said pivot to couple with said stop arm of said body;
   said stop arm contacting said stop edge of said cover while said foldable SIM card connector being opened to an angle.

10. The foldable SIM card connector as claimed in claim 9, wherein said angle is 90 degree.

11. The foldable SIM card connector as claimed in claim 9, wherein:
    each said pivoting cavity defines a first pivoting hole and a second pivoting hole being adjacent to said first pivoting hole;
    a stop portion formed between said first and second pivoting holes;
    and said stop portion forming a groove communicating with said first and second pivoting hole.

12. The foldable SIM card connector as claimed in claim 9, wherein:

a projection is defined below said stop arm;
a fixing channel is formed between said stop arm and said projection.

13. The foldable SIM card connector as claimed in claim 11, wherein:
said body defines at least one receiving cavity and a locking cavity being adjacent to said receiving cavity;
said receiving cavity communicating with the top surface of said body;
a locking lump formed above said locking cavity;
a stop lump located between said receiving cavity and said locking cavity; and
a front portion of said side board of said cover defining at least one elastic locking portion to couple with said receiving and locking cavities of said body and being locked by said locking lump.

* * * * *